UNITED STATES PATENT OFFICE.

WILLIAM R. WALKER, OF NEW YORK, N. Y.

MANUFACTURE OF STEEL.

980,369.  Specification of Letters Patent.  Patented Jan. 3, 1911.

No Drawing.  Application filed January 2, 1909. Serial No. 470,342.

*To all whom it may concern:*

Be it known that I, WILLIAM R. WALKER, of the city, county, and State of New York, have invented an Improvement in the Manufacture of Steel, of which the following is a specification.

By my invention I am enabled to improve greatly the quality of steel manufactured by the open hearth and Bessemer processes, and thus with comparatively little addition to the cost to provide a grade of steel much superior to that which heretofore has been made.

In the practice of my invention I take steel which has been finished by the converter or open hearth processes in the usual way, whether in the acid lined converter or acid lined open hearth furnace or in a basic lined converter or basic open hearth furnace, and tap it at the end of the heat into a ladle or vessel, adding in the ladle or converter or open hearth furnace the usual additions of ferro-manganese or other alloys to bring the steel to the desired character. In these respects my process is like the process of steel manufacture heretofore carried on. When it is in the ladle, however, instead of pouring it immediately into the ingot molds I subject it to electrical heat applied preferably by introducing electrodes through the cover of the ladle, or by heating the metal by means of an induced electric current, and I maintain the steel thus subjected to heat for a considerable time, preferably twenty minutes or thereabout, at the same temperature or a little higher temperature than that at which it was tapped from the furnace. The purpose of this operation is not to cause any further reduction of the phosphorus or silicon content of the steel, but to keep it in a quiet condition subjected to heat so as to allow the ferro-manganese or other additions to have their full effect, to allow gases to escape from the metal and to permit intermingled slag and other impurities to rise to the surface of the metal, and the steel to become thoroughly quieted, after which it is poured. No new slag-making materials are introduced into the ladle. It will be found when this practice is followed that the steel can be brought to the desired condition with much less manganese than heretofore, thus effecting an economy of materials; and by reason of the lessened percentage of manganese the evil effects which are sometimes caused by the formation of carbid of manganese in the steel are largely prevented. The steel is also brought to a quiet condition, the evils of segregation are largely cured, and ingots are cast much freer from defects and cavities than has heretofore been possible. The temperature of the steel at the time of pouring is also rendered easily controllable, whereby it can be tapped from the furnace and cast at a lower temperature and this tends to reduce segregation. The process has other advantages which will be appreciated by those skilled in the art.

I claim:—

1. The method of making steel, consisting in treating the metal in an open hearth furnace or Bessemer converter, then withdrawing the steel thus formed into a movable vessel with the desired alloy additions, electrically heating the steel in said vessel to maintain it in a molten condition and allow the additions to take effect and permit rise of impurities to the surface and escape of gases, and then pouring direct from the electrically heated vessel into mold, substantially as described.

2. The process of making steel, consisting in subjecting the metal to treatment in an open hearth furnace or Bessemer converter, then withdrawing the steel thus formed into a movable ladle with the desired alloy additions, maintaining it in molten condition in said ladle subject to electrical heat to allow rise of impurities to the surface, escape of gases and proper action of the additions, and then pouring direct from said ladle into the mold, substantially as described.

In testimony whereof, I have hereunto set my hand.

WILLIAM R. WALKER

Witnesses:
H. CLAY REIMER, Jr.,
ANNA E. WALLACE.